United States Patent Office

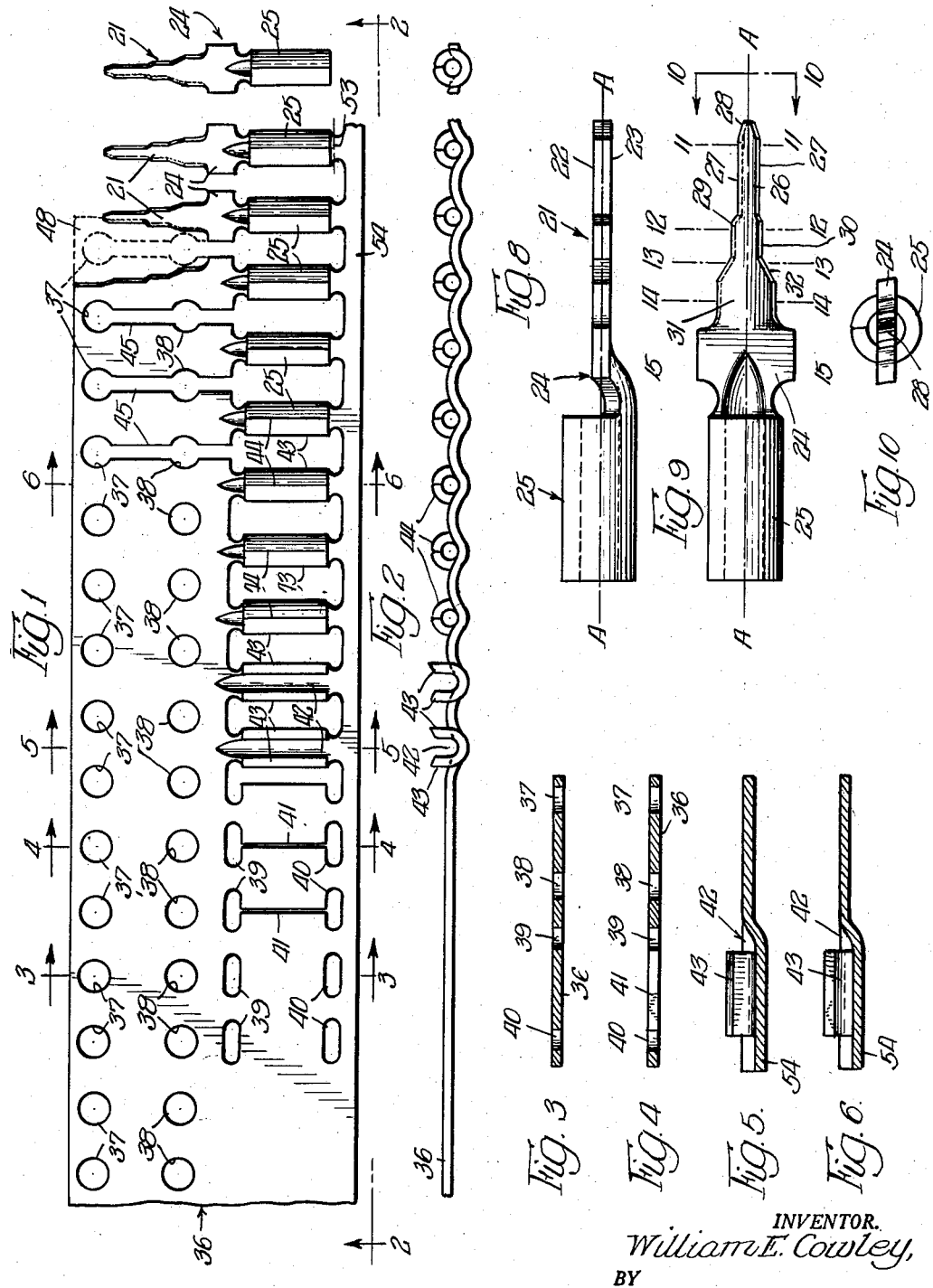

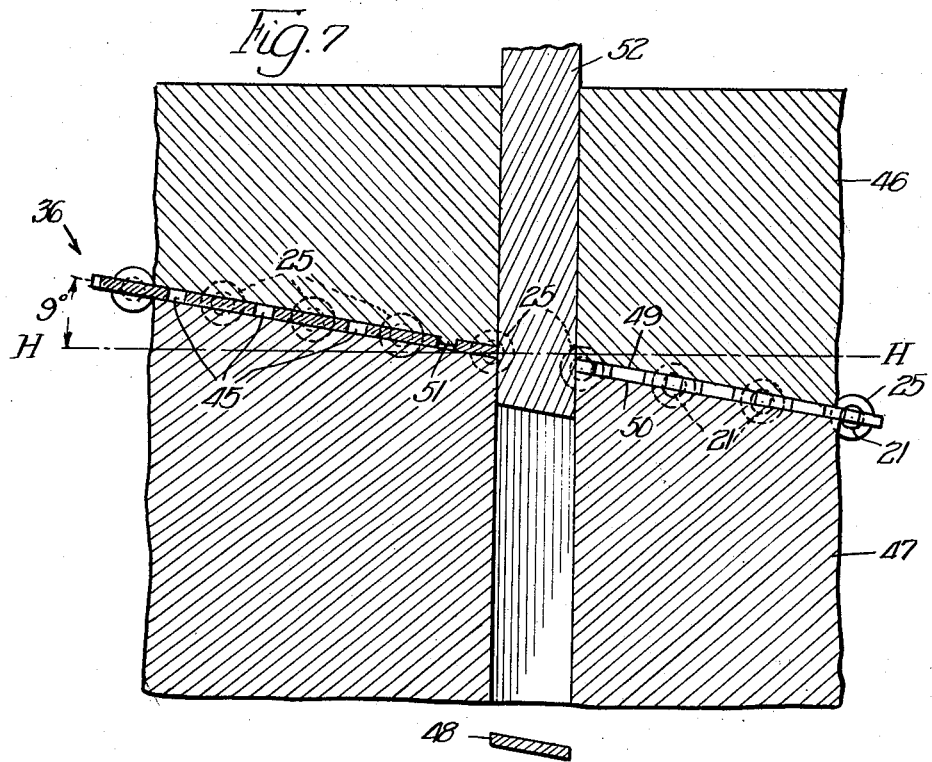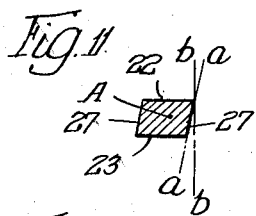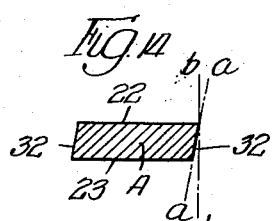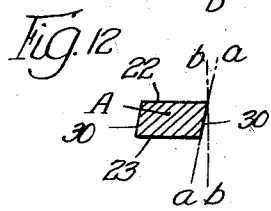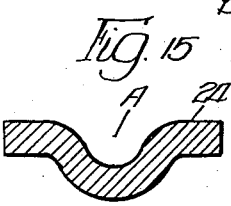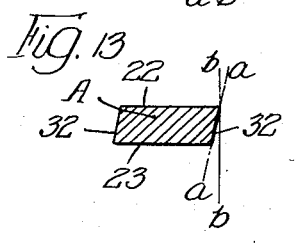

2,846,902
Patented Aug. 12, 1958

2,846,902

DRILL ELEMENTS

William E. Cowley, Louisville, Ky., assignor to American Saw & Tool Company, Louisville, Ky., a corporation of Kentucky Application February 6, 1956, Serial No. 563,493

9 Claims. (Cl. 76—108)

This invention relates to drill elements such as screw pilots and the like and to novel and improved means and method of manufacturing such devices.

The primary object of the invention is to provide a simple, economical and practical process by which screw pilots and like drill elements may be stamped, sheared and otherwise formed from flat sheet metal stock.

A further important object of the invention is to provide a drill element or screw pilot formed from such flat sheet metal stock.

Previously such elements have been formed by machining or forging metal to the required shape which as compared with the hereinafter described method of application made such elements relatively expensive to manufacture. However it is now proposed, by means of a limited number of simple punching, rolling and shearing operations, to produce drill elements in such mass quantities from readily available and inexpensive sheet metal stock as to considerably reduce the cost of such elements.

Further and important objects of the invention are to devise means and method by which the shank and drill or blade portion of such elements may be stamped or cut from flat sheet metal stock as a single and integral piece; by which the blade portion of such devices may be cut to required shape from said sheet stock in a single shearing operation and the shank also worked from the same piece of sheet metal stock into a round approximately cylindrical form having its axis in the plane of said sheet stock so that the finished product may be properly supported in the arbor of drill tools; and by which not only may the required shape of the blade of such elements be formed in a single punching or shearing operation but whereby simultaneously the opposed cutting edges of such drill elements may be provided with the required clearance angles in said blanking as to make unnecessary further working.

Still other objects of the invention are to provide a screw pilot or other drill element which will be formed according to the herein described process.

Economies of operation result not only from the fact that relatively inexpensive flat sheet stock may be utilized but also because the operations required to form the drill element are limited in number and uncomplicated in character whereby they may be performed in ordinary conventional punch presses and without resort to expensive multi-stage type presses. Furthermore the entire operation can be carried on with little or no skill on the part of the operator.

Many other objects as well as advantages of the invention will be apparent from the description of the device and process of forming the same as hereinafter fully explained. It is further to be understood that said description is not to be taken in a limiting sense but merely as illustrative of how the invention may be carried out according to the teachings herein.

Now referring to the drawings:

Figure 1 represents flat sheet metal stock on which, beginning at the left and proceeding to the right, the various operations required in the process have been illustrated in a way to show the cumulative effect of said steps in producing the final product;

Figure 2 is a side view of the sheet illustrated in Figure 1 looking in the direction indicated by the arrows 2—2;

Figure 3 is a cross sectional view taken through the sheet in Figure 1 along lines 3—3;

Figure 4 is a cross section view taken through the sheet along lines 4—4 in Figure 1;

Figure 5 is a cross sectional view taken through the sheet illustrated in Figure 1 along lines 5—5;

Figure 6 is a cross sectional view taken along lines 6—6 of the sheet illustrated in Figure 1;

Figure 7 is a fragmentary view, somewhat exaggerated, to illustrate the angular disposition of the sheet in the shearing operation by which the drill portion is formed;

Figure 8 is a side elevational view of a device produced according to the invention;

Figure 9 is a top plan view of the device;

Figure 10 is an end view of the device taken from the right hand side of Figure 9 and looking in the direction indicated by arrows 10—10;

Figure 11 is a cross sectional view of the device taken along lines 11—11 in Figure 9;

Figure 12 is a cross sectional view of the device taken along lines 12—12 in Figure 9;

Figure 13 is a cross sectional view of the device taken along lines 13—13 in Figure 9;

Figure 14 is a cross sectional view of the device taken along lines 14—14 in Figure 9; and Figure 15 is a cross sectional view of the device taken along lines 15—15 in Figure 9.

Referring first to Figures 8 through 15 it will be seen that a screw pilot according to the present invention comprises a three step blade portion indicated generally at 21 having substantially flat opposed surfaces 22 and 23, a supporting shank 25 and an intermediate section 24 by which said blade 21 is joined to its supporting shank. Said supporting shank 25 has a generally round cylindrical shape and is sized to fit in a standard drill chuck with its axis disposed along line A—A and substantially coinciding with the axis of the said cutting portion 21.

As seen best in Figure 9, blade 21 terminates in an elongated drill portion 26 having substantially parallel opposed sides 27 and a tapered end 28. Said portion 26 is dimensioned so as to form a pilot opening for the wood screw somewhat smaller than the diameter of the threaded portion of the screw to be secured therein. Intermediate step portion 29 of said blade 21 which is somewhat wider also has opposed approximately parallel edges 30 and serves to enlarge the upper part of the drilled opening to receive the shank or unthreaded portion of the screw. The third step of said blade 21 embodies a countersink forming portion 31 having opposed inwardly converging edges 32 which form the countersink or recess at the top of the drilled opening to receive the head of the screw. As shown most clearly in Figures 11, 12, 13 and 14, the opposed edges of each of said portions 26, 29 and 31 have their respective side edges 27, 30 and 32 in parallel relation with each other but lying on lines a—a which are preferably angled at approximately 9° from a normal (b—b) to their flat surfaces 22 and 23. This provides its cutting edges with a correct clearance angle for wood cutting. It is contemplated that such inclination of the cutting edges of the blade 21 of the screw pilot may be performed, according to the present invention, in the shearing operation as hereinafter described without further working or twisting of said portion 21 from an initial flat shape as might otherwise be necessary. It is to be understood that the cutting edges of said drill blade 21 can be inclined at any other angle if desired or thought necessary. Since the intermediate portion 24 has no cutting function, it is not necessary to provide the edge of this portion 24 with such clearance angles and are therefore not so shown in Figure 15. Obviously, however, there would be no reason to avoid shearing its edges at such an angle if it were more convenient to do so but as pointed out above, the shape of said edges is not critical.

Now referring to Figure 1 it will be seen that such a device can be readily and conveniently formed from sheet stock by subjecting such stock to a limited number of simple, uncomplicated piercing, slitting, punching, rolling and shearing operations. These operations furthermore can be performed in a single punch-press using a multiple die or each of the steps may be performed singly in separate presses or dies, or in any combination thereof. The cumulative effect of these steps is illustrated in Figure 1. Beginning at the left hand side of this figure, it will be understood that the sheet of metal stock 36 is initially punched to provide it with two spaced lines of spaced holes 37 and 38. These function primarily as means for properly locating the sheet stock between the dies in the press or presses for each of the succeeding operations.

In order to form the shanks of the screw pilots from said sheet stock a succession of spaced slots 39 and 40 are next punched in the material in alignment with holes 37 and 38. Said slots 39 and 40 are then interconnected by slits 41. The intervening areas between the slits 41 define the portions of the sheet stock subsequently worked into the cylindrical shanks 25. This is accomplished by striking said areas between the slits with a suitable shaped member to form depressions 42 which extend laterally of the sheet between slots 39 and 40. The effect of this is, as seen in Figure 2, to displace a longitudinal section thereof below the plane of the sheet and which brings the sides 43 thereof upwardly in a substantially vertical direction (Figures 2 and 5). This striking operation serves first to permit the shank to be rounded in a succeeding operation into a desired substantially cylindrical shape which will have its axis located intermediate the opposed flat surfaces of the yet unworked portion of the metal sheet and it also obviously provides a convenient means of properly locating a mandrel over which said sides 43 can be rolled to obtain said required cylindrical shape. Preferably, the shank 25 thus formed is restruck to close the gap 44 between the sides 43 and firmly bring their adjacent edges together. This completes the steps of forming the shank 25.

Preparatory to shearing the blades, it has been found advantageous to connect holes 37 and 38 by slots 45 so as to permit a more positive locking of the sheet 36 between the dies 46 and 47 in said shearing operation. As illustrated in Figure 7, dies 46 and 47 have parallel faces 49 and 50 between which the sheet 36 is fed and which faces 49 and 50 are angled 9° off the horizontal indicated by line H—H. Preferably, die 47 is held stationary while member 46 reciprocates in a vertical direction to permit the sheet stock 36 to be intermittently fed therebetween and allow its portion 51 to be located in slot 45 to hold said sheet stock 36 in place during the vertical descent of punch or shearing member 52 to punch out portion 48. It will be clear from Figure 1, that the action of member 52 thus serves to simultaneously shape one side of each of two adjacent blade portions 21. The angle of the path along which punch 52 moves relative to the sheet stock at the same time provides the correct clearance angles for wood cutting. In this case 9°. The completed screw pilot 21 may be then severed from scrap portion 54 along dotted line 53 by a separate punch not shown and blown off the die 46, separating the finished products from the scrap.

It will be noted that, in the process, the cutting portion 21 of the screw pilot so formed retains the initial flat shape of the sheet stock but that its opposed cutting edges have been sheared at a required angle for cutting. Also, it will be noted that the shank portion 25 of said pilots although rounded into a substantially cylindrical shape are integrally joined with blade 21 and have their axis in substantial coincidence with the axis of the cutting portion 21 whereby the finished pilot may be properly supported in the arbor of a conventional drill tool.

An obvious advantage of the process is that the various steps in forming the screw pilots may be carried on in sequence on the same sheet of stock while the several elements, in their various stages of completion, may be held together by said connecting strips of scrap 54 until the pilots have been completely formed and severed therefrom along line 53 as indicated previously and that the process as described is adapted for economical and practical mass production of a variety of drill elements other than screw pilots by the proper selection of a cutting face for punch 52.

Thus it will be apparent that all of the objects and advantages of the invention can be obtained in a convenient, simple and practical manner.

Having described my invention, I claim:

1. In the process of forming a drill element from a flat sheet comprising the steps of depressing an area thereof below the plane of said sheet, turning up portions on either side thereof to a substantial cylindrical shape having an axis in the plane of said sheet, then shearing out the main body of the drill element from a portion of the sheet to one side of the depressed area so that said main body and cylinder constituting the drill element may be separated from the sheet as an integral unit, and controlling the direction of shear to be at an angle other than perpendicular to said sheet.

2. The process of forming drill elements such as screw pilots and the like from flat sheet stock comprising the steps of making parallel spaced cuts in a sheet of selected material at predetermined spaced points therealong, making further cuts in said sheets to connect said parallel spaced cuts by pairs, then rounding the portions of said sheet between the pairs of cuts to a substantial cylindrical shape having an axis in the plane of said sheet stock, and shearing portions from the remainder of the sheet that are integrally connected with each of said cylindrically shaped portions, said portions being sheared to the shape desired of the main body of the drill elements, and controlling the direction of shear to be out of perpendicular with said sheet stock.

3. The process of forming drill elements such as screw pilots and the like from flat sheet stock comprising the steps of making spaced cuts in a sheet of selected material at predetermined spaced points along a pair of spaced lines, making further cuts in said sheet connecting the intermediate section of each of the slots in one line with the intermediate section of an adjacent slot in the other line, depressing an area between the pairs of cuts thus connected and curving the portions of said sheet between the cutting cuts as to form with said depressed areas a substantial cylindrical shape having an axis in the plane of said sheet stock, then shearing portions from the remainder of the sheet integrally connected with each of said cylindrical portions which are to the shape desired of the main body of the drill elements, and so controlling the direction of said shearing as to be out of perpendicular with said sheet stock.

4. The process of forming drill elements such as screw pilots and the like from flat sheet stock comprising the steps of slotting a sheet of selected material at predetermined spaced points along a pair of spaced lines and spaced from an edge of said sheet, slitting said sheet to connect each of the slots in one line with an adjacent slot in the other line, depressing the areas lying between the pairs of slots thus connected and so rounding the portions of said sheet between the pairs of slits as to form with said depressed areas a substantial cylindrical shape having an axis in the plane of said sheet stock and perpendicular to said lines of slots, then cutting out a portion from the remainder of the sheet integrally connected with each of said cylindrically shaped portions to the shape desired of the main body of the drill elements.

5. The process as claimed in claim 4 wherein the line of shear in said cutting out operation is controlled to be out of perpendicular with said sheet stock.

6. The process according to claim 5 wherein the line of shear is controlled to be approximately 9° away from said perpendicular.

7. The process of forming drill elements such as screw pilots and the like from flat sheet stock comprising the steps of making at least two pairs of spaced parallel cuts in a sheet of selected material, then further cutting said sheet to connect the intermediate section of the cuts of each pair, depressing the areas lying between the pairs of cuts thus connected and so rounding the portions of said sheet on either side of said depressed area defined by the cuts as to produce a substantial cylindrical shape having an axis in the plane of said sheet stock and perpendicular to said first mentioned cuts, which will constitute the shank of said drill element and then cutting out a portion from the remainder of the sheet which is integrally connected with said cylindrically shaped portion to the shape desired of the main body of the drill elements.

8. The process according to claim 7 wherein the act of cutting is so controlled that its line of shear is out of perpendicular with said sheet stock.

9. In the process of manufacturing drill elements from a length of flat sheet stock the steps which comprise punching the flat sheet stock at selected intervals along its length, using said punchings to intermittently feed and successively locate predetermined sections of said sheet stock between a pair of separated shearing dies, said dies having parts adapted as the dies are brought together to cut from said sections portions defining the opposed cutting edges of drill elements which include a countersink forming portion having opposed converging side edges and a long narrow drill portion, bringing the dies together to effect shearing of each successively located section while holding said section against movement and in a plane intersecting at a pre-selected angle other than normal thereto the axis along which the dies are brought together, whereby the side edges of the drill and countersink forming portions of the drill elements will be simultaneously imparted a desired clearance angle as the drill elements are sheared out of the sheet stock, and, thereafter, separating the dies to permit insertion of the next successive section of the sheet stock therebetween.

References Cited in the file of this patent

UNITED STATES PATENTS

| | | |
|---|---|---|
| 676,782 | Stimpson | June 18, 1901 |
| 2,162,117 | Perry | June 13, 1939 |
| 2,387,983 | Dickenson | Oct. 30, 1945 |
| 2,626,533 | Huckshold | Jan. 27, 1953 |
| 2,655,964 | Labbee | Oct. 20, 1953 |
| 2,705,534 | Ingersoll | Apr. 5, 1955 |
| 2,732,869 | Stearns | Jan. 31, 1956 |

FOREIGN PATENTS

| | | |
|---|---|---|
| 522,458 | Belgium | Aug. 29, 1953 |